(12) United States Patent
Fischbach-Borazio et al.

(10) Patent No.: US 8,500,218 B2
(45) Date of Patent: Aug. 6, 2013

(54) HYDRAULIC SYSTEM

(75) Inventors: Petra Fischbach-Borazio, Frankfurt (DE); Heiko Gastauer, Losheim am See (DE); Axel Hinz, Neu-Anspach (DE); Uwe Greiff, Seligenstadt (DE)

(73) Assignee: Continental Teves AG & Co. oHG (DE)

( * ) Notice: Subject to any disclaimer, the term of this patent is extended or adjusted under 35 U.S.C. 154(b) by 359 days.

(21) Appl. No.: 12/992,156

(22) PCT Filed: May 6, 2009

(86) PCT No.: PCT/EP2009/055442
§ 371 (c)(1),
(2), (4) Date: Nov. 11, 2010

(87) PCT Pub. No.: WO2009/138339
PCT Pub. Date: Nov. 19, 2009

(65) Prior Publication Data
US 2011/0062776 A1    Mar. 17, 2011

(30) Foreign Application Priority Data

May 15, 2008  (DE) .......................... 10 2008 023 808
Aug. 8, 2008  (DE) .......................... 10 2008 037 047

(51) Int. Cl.
*B60T 8/40*   (2006.01)

(52) U.S. Cl.
USPC . 303/116.1; 303/10; 303/119.3; 303/DIG. 10

(58) Field of Classification Search
USPC ................ 303/116.1, 10–12, 113.1–113.3, 303/116.2–116.4, 119.1–119.3, DIG. 10, 303/DIG. 11
See application file for complete search history.

(56) References Cited

U.S. PATENT DOCUMENTS

| | | | |
|---|---|---|---|
| 6,127,752 A * | 10/2000 | Wiesler ....................... 310/68 B |
| 6,142,583 A | 11/2000 | Steffes | |
| 6,234,199 B1 | 5/2001 | Nohira | |
| 6,260,582 B1 | 7/2001 | Trautmann | |
| 6,398,315 B1 * | 6/2002 | Dinkel et al. ............. 303/113.1 |
| 6,428,121 B1 | 8/2002 | Dinkel et al. | |
| 7,018,003 B2 * | 3/2006 | Otto et al. .................. 303/119.3 |
| 2004/0075339 A1 | 4/2004 | Volz | |
| 2006/0056995 A1 | 3/2006 | Dinkel et al. | |
| 2006/0220768 A1* | 10/2006 | Iyatani ............................ 335/78 |
| 2007/0040445 A1* | 2/2007 | Otto ............................ 303/119.3 |
| 2007/0096553 A1 | 5/2007 | May et al. | |

FOREIGN PATENT DOCUMENTS

| | | |
|---|---|---|
| DE | 199 59 670 A1 | 6/2000 |
| DE | 102 45 069 A1 | 4/2004 |
| DE | 103 39 882 A1 | 1/2005 |
| EP | 1 707 463 A2 | 10/2006 |
| EP | 1 746 288 A2 | 1/2007 |
| WO | WO 97/37879 | 10/1997 |
| WO | WO 97/48583 | 12/1997 |
| WO | WO 98/47748 | 10/1998 |
| WO | WO 00/46089 | 8/2000 |
| WO | WO 02/060734 A1 | 8/2002 |
| WO | WO 2004/113142 A1 | 12/2004 |

\* cited by examiner

*Primary Examiner* — Pamela Rodriguez
(74) *Attorney, Agent, or Firm* — RatnerPrestia

(57) ABSTRACT

A hydraulic system for a slip-regulated dual circuit braking system includes two separating valve receiving holes disposed between a plurality of wheel brake connections which open up into the receiving body and the valve receiving holes of a first valve series include a plurality of inlet valves.

15 Claims, 2 Drawing Sheets

HYDRAULIC SYSTEM

This application is the U.S. national phase application of PCT International Application No. PCT/EP2009/055442, filed May 6, 2009, which claims priority to German Patent application No. 10 2008 023 808.2, filed May 15, 2008, and German Patent Application No. 10 2008 037 047.9, filed Aug. 8, 2008, the content of such applications being incorporated by reference herein.

FIELD OF THE INVENTION

The invention relates to a hydraulic system for a slip-controlled brake installation.

BACKGROUND OF THE INVENTION

A hydraulic system of the abovementioned type is already known from EP 1 707 463 A2, which is incorporated by reference. The hydraulic system consists of a block-shaped reception body which, for antilock control, receives inlet and outlet valves in a plurality of valve reception bores of a first and second valve row. Furthermore, the reception body has arranged in it a pump bore which is oriented transversely with respect to the issue of the valve reception bores into the reception body, with a motor reception bore which is directed perpendicularly with respect to the pump bore, and also with a plurality of pressure-medium ducts which connect the valve reception bores and the pump bore and which can make a hydraulic connection between the brake-pressure transducer connections issuing into the reception body and a plurality of wheel-brake connections.

What is to be considered a disadvantage is that the isolating-valve reception bores required for traction control and the control of driving dynamics are arranged directly next to the second valve row receiving the outlet valves, and therefore pressure-medium ducts, relatively complicated to make, are required in the reception body, so that the brake-pressure transducer connections and the valve reception bores of the first valve row can be connected to the isolating-valve reception bores. Another disadvantage arises on account of the space required by the isolating-valve reception bores, so that, because of the need to position the low-pressure accumulator bores between the two isolating-valve reception bores, the free space available underneath the second valve row is used up.

SUMMARY OF THE INVENTION

An object of the invention, therefore, to design a hydraulic system of the type specified as simply and as cost-effectively as possible and with as compact a build as possible, without in this case having to tolerate restrictions with regard to functionality, inter alia also in terms of immersion leaktightness and/or of noise behavior.

BRIEF DESCRIPTION OF THE DRAWINGS

The invention is best understood from the following detailed description when read in connection with the accompanying drawings. Included in the drawings is the following figures.

DETAILED DESCRIPTION OF THE PREFERRED EMBODIMENTS

Figure 1:
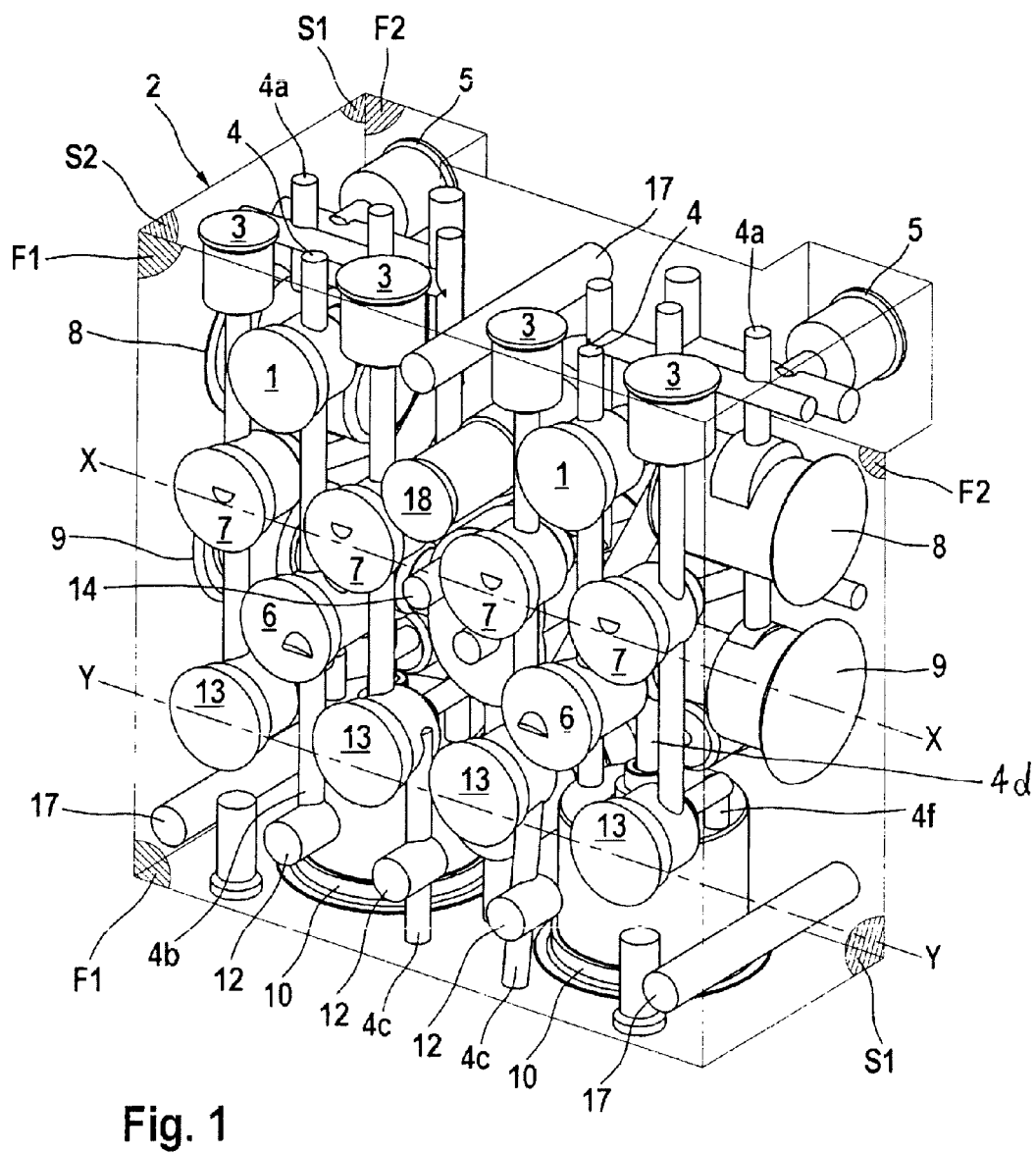
FIG. 1 shows a perspective illustration of the reception body for the hydraulic system according to aspects of the invention in a plan view of a first flange surface of the reception body, into which flange surface the valve reception bores issue.
Figure 2:
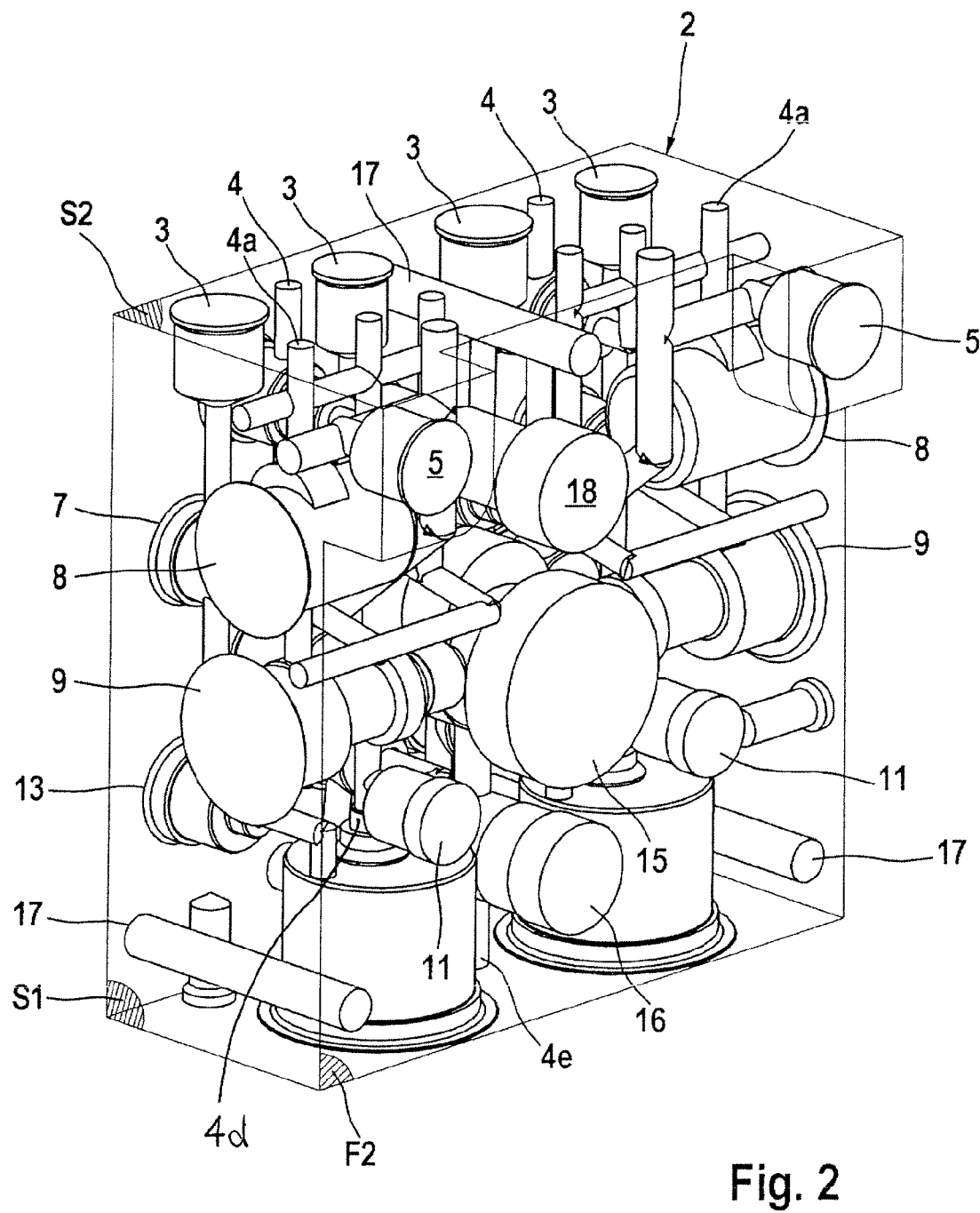
FIG. 2 shows the hydraulic system according to FIG. 1 in a diametral view, with a plan view of a second flange surface of the reception body, into which flange surface issue the brake-pressure transducer connections, the pulsation damper bores, the leakage bore and the motor reception bore.

The hydraulic system evident from FIGS. 1 and 2 has a block-shaped reception body 2 for a traction, antilock and driving dynamics control system of a motor vehicle. For this purpose, the reception body 2 receives a plurality of inlet valves in a plurality of valve reception bores 7 of a first valve row X and a plurality of outlet valves in the valve reception bores 13 of a second valve row Y, the two valve rows X, Y being arranged parallel. Furthermore, the reception body 2 has arranged in it a horizontally continuous pump bore 9 for the reception of a dual-circuit radial piston pump which is oriented transversely with respect to the direction of issue of the valve reception bores 7, 13 parallel between the two valve rows X, Y. A motor reception bore 15 for an electric motor issues at mid-length into the pump bore 9 and is directed parallel to the valve reception bores 7, 13 into a (second) flange surface F2 of the reception body 2. To connect the electric motor electrically to a control apparatus which is arranged diametrally to the electric motor on a first flange surface F1 of the reception body 2, the reception body 2 has a cable passage bore 18 which is concealed by the electric motor as soon as the electric motor is fastened to the flange surface F2. A pair of low-pressure accumulator bores 10 issue in a parallel arrangement into the reception body 2 transversely with respect to the valve reception bores 7, 13 and directly next to the second valve row Y. The low-pressure accumulator bores 10 and also the valve reception bores 7, 13 and the pump bore 9 are connected to pressure-medium ducts which connect the two brake circuits in the reception body 2 according to the recirculation principle. The pressure-medium ducts thus make, via the low-pressure accumulators 10, the valve reception bores 7, 13 and the pump bore 9, the desired hydraulic connection between two brake-pressure transducer connections 5 issuing into the reception body 2 and a plurality of wheel-brake connections 3.

To minimize the outlay in production terms and also with the aim of increasing the functionality of the hydraulic system with a view to autonomous brake operation (traction and driving dynamics control), further bores required, which are described below, are placed optimally in the reception body 2 on the basis of the already explained bores and pressure-medium ducts in the reception body 2.

Outside the two valve rows X, Y, therefore, two isolating-valve reception bores 1 are provided, which, according to aspects of the invention, are arranged in the reception body 2, in a manner optimized in terms of construction space, between a plurality of wheel-brake connections 3 issuing into the reception body 2 and the first valve row X. The isolating-valve reception bores 1 are designed as blind bores which issue into the reception body 2 in each case in a transverse position between the two wheel-brake connections 3 of a brake circuit. A sufficient clearance remains in each case between two wheel-brake connections 3 of a brake circuit for the purpose of leading through a pressure-medium duct 4 which is connected to the associated isolating-valve reception bore 1 and which connects the brake-pressure transducer connection 5, required for a brake circuit, via the associated isolating-valve reception bore 1, to the two valve reception bores 7 of the first valve row X which are arranged within a brake circuit.

It may be gathered from FIG. 1 that the first valve row X is arranged between the two isolating-valve reception bores 1 and the two changeover-valve reception bores 6, for which purpose the valve reception bores 7 of the first valve row X and the isolating-valve and changeover-valve reception bores 1, 6 issue in a parallel arrangement into the first flange surface F1 of the reception body 2. The isolating-valve and changeover-valve reception bores 1, 6 are in each case arranged, offset laterally with respect to the valve reception bores 7 of the first valve row X, in the reception body 2, thus affording the best possible utilization of space within the reception body 2. A further advantage with regard to production arises as a result of the aligned orientation of the isolating-valve reception bores 1 with respect to the changeover-valve reception bores 6, for which purpose the isolating-valve reception bores 1 are arranged in each case between a pair of wheel-brake connections 3.

The two isolating-valve reception bores 1 receive two directional seat valves which are open in the basic position and which are closed electromagnetically during autonomous brake operation, with the result that the connection between the brake-pressure transducer connections 5 and the valve reception bores 7 in the first valve row X is broken. Directional seat valves are likewise inserted into the changeover-valve reception bores 6 and in their basic position shut off the connection between the brake-pressure transducer connections 5 and the suction side of the pump bore 9, but are opened electromagnetically during autonomous brake operation.

Furthermore, it can be seen clearly both from FIG. 1 and from FIG. 2 that two noise damping chambers 8 issue transversely with respect to the isolating-valve reception bores 1, in a diametral arrangement, in each case into a lateral surface S1 of the reception body 2, which lateral surface is delimited by the first and the second flange surface F1, F2. The two noise damping chambers 8 are arranged parallel to the pump bore 9, above the first valve row X, so as to reach approximately up to the valve reception bores 1, and are in each case penetrated transversely from the top downward by a pressure-medium duct 4a, for which purpose the pressure-medium duct 4a, for connecting the two noise damping chambers 8 to the pump bore 9, extends from a further lateral surface S2 of the reception body 2 into the high-pressure region of the pump bore 9.

Between the two pressure-medium ducts 4a required for the two noise damping chambers 8, all the wheel-brake connections 3 necessary for a dual-circuit brake installation issue into the further lateral surface S2. The pressure-medium ducts 4a are closed, tight to pressure medium, after the drilling operation by means of suitable press-in bodies at the points of issue of the two pressure-medium ducts 4a in the further lateral surface S2. It can be seen from FIG. 1 that the further lateral surface S2 is delimited by the two flange surfaces F1, F2 and by the diametral lateral surfaces S1, the two brake-pressure transducer connections 5 issuing directly into the second flange surface F2 above the noise damping chambers 8, and the brake-pressure transducer connections 5 being spaced apart, by the noise damping chambers 8 issuing into the lateral surface S1, from the wheel-brake connections 3 arranged in the plane of the brake-pressure transducer connections 5.

Furthermore, pressure sensor bores 12 issue into the first flange surface F1 and are arranged next to or between the low-pressure accumulator bores 10, one of the pressure sensor bores 12 being connected to a pressure-medium duct 4b which penetrates through the isolating-valve and changeover-valve reception bore 1, 6 and which has a connection to one of the two brake-pressure transducer connections 5. The connection point provided for the pressure sensor bore 12 is oriented vertically in alignment with the valve reception bores 1, 6 which receive the isolating valve and changeover valve and which utilize the horizontal clearance between the valve reception bores 7, 13 of the first and the second valve row X, Y for reception and connection to the pressure-medium duct 4b, so that the drilling operation in order to make the pressure-medium connection between the abovementioned elements is relatively simple.

Furthermore, at least one of the further pressure sensor bores 12 is connected to a valve reception bore 13 of the second valve row Y, for which purpose the reception body 2 is penetrated, on the lateral surface opposite to the further lateral surface S2, by at least one pressure-medium duct 4c which traverses the further pressure sensor bore 12 in the direction of the associated valve reception bore 13 in the second valve row Y.

Said pressure sensor bores 12 make it possible, according to the connection pattern initially described, in conjunction with suitable pressure sensors, to detect the hydraulic pressure prevailing at the wheel-brake connection 3 and at the brake-pressure transducer connection 5, in order, with the aid of suitable valve control, to ensure that the brake installation operates comfortably and as required.

Furthermore, a sensor bore 14 between the two valve rows X, Y is provided for receiving a rotary-signal and/or position transducer, in order to detect the position of the pumping pistons in the pump bore 9, for which purpose the sensor bore 14 issues from the direction of the first flange surface F1 into the motor reception bore 15 which issues transversely with respect to the pump bore 9 and in which a pump drive is inserted.

FIG. 2 shows the reception body 2 in a view of the second flange surface F2, from which it is clear that the motor reception bore 15 is arranged approximately centrally in the reception body 2. Furthermore, it can be seen that two pulsation damper bores 11 issue into the second flange surface F2 of the reception body 2 between the pump bore 9 and the two low-pressure accumulator bores 10. Each pulsation damper bore 11 is connected to a pressure-medium duct 4d which in each case connects one of the two low-pressure accumulator bores 10 to the suction region of the pump bore 9.

Between the two low-pressure accumulator bores 10, a leakage bore 16 issues into the reception body 2 from the direction of the second flange surface F2, the leakage bore 16 being connected to the motor reception bore 15 via a pressure duct 4e arranged between the low-pressure accumulator bores 10, into which motor reception bore the pump leakage occurring within the pump bore 9 passes.

The leakage bore 16 ensures the immersion leaktightness and leakage safety of the hydraulic system, for which purpose the leakage bore 16 is designed as a blind bore. This leakage bore 16 issues into the reception body 2 in a clearance defined essentially by the position and size of the motor reception bore 15, parallel to the cable passage bore 18, between the low-pressure accumulator bores 10 and the second valve row Y. This ensures that, when the electric motor is inserted into the motor reception bore 15, not only is the electrical contacting of the electric motor closed within the cable passage bore 18, but the leakage reception bore 16 can also be concealed and closed preferably as a result of a corresponding configuration of the electric motor.

The hydraulic system evident from FIGS. 1 and 2 is designed for a dual-circuit brake system with wheel-individual brake-pressure control, with the particular feature that each valve reception bore 13 arranged in the second valve row Y is connected in each case via a specific pressure-medium duct 4f to the nearest low-pressure accumulator bore 10, so that in each case two pressure-medium ducts 4f connected to the second valve row Y issue into each bottom of the two low-pressure accumulator bores 10, between which pressure-medium ducts is arranged in each case the pressure-medium duct 4d which connects each suction side of the pump bore 8 to the nearest low-pressure accumulator bore 5 via the associated pulsation damper bore 11. The two low-pressure accumulator bores 10 therefore have as short connections as possible to the pump suction side of the pump bore 9 and for connection to the valve reception bores 13 of the second valve row Y, thus giving rise to as small a dead space volume as possible for the secondary region of each brake circuit (that is to say, between the outlet valves, closed in the basic position, of the second valve row Y and of the pump suction side), so that the evacuation and filling of the hydraulic system with brake fluid can be carried out as simply as possible.

To fasten the control apparatus, provided for activating the electric motor and the inlet and outlet valves, to the first flange surface F1 and to fasten the electric motor, required for driving the radial piston pump, to the second flange surface F2 arranged diametrically with respect to the first flange surface F1, the reception body 2 is provided with a plurality of through bores 17 which are penetrated by a plurality of screws in the manner of a tie rod, in order to fix the control apparatus and electric motor to the reception body 2 simply, securely, and so as to be liquid-tight, under uniform pressure forces.

This tie rod connection affords a cost-effective concept which is beneficial in terms of construction space and which allows optimal space utilization within the control apparatus. Furthermore, if desired or as required, any leakages of the pump can be collected in a closed reservoir of the electric motor, since the latter is placed on the leakage bore 16 and seals off there.

The described design of the pressure-medium ducts 4, 4a-e, in conjunction with the optimized placing of the valve reception bores 1, 6, 7, 13, simplifies the robotic production of the hydraulic system, since, instead of five, only four machining directions are to be taken into account during manufacture.

The invention claimed is:

1. A hydraulic system for a slip-controlled brake installation comprising:
a reception body which receives inlet valves in a plurality of valve reception bores of a first valve row and outlet valves in a second valve row,
a pump bore arranged in the reception body and which is oriented transversely with respect to a direction of issue of the valve reception bores between the two valve rows,
changeover-valve reception bores arranged between the first valve row and the second valve row and which are connected to a suction side of the pump bore and to a pair of brake-pressure transducer connections,
isolating-valve reception bores arranged in the reception body outside the two valve rows, and
a pair of low-pressure accumulator bores in a parallel arrangement, which issue into the reception body remotely from the first valve row and next to the second valve row,
wherein the isolating-valve reception bores are arranged between a plurality of wheel-brake connections issuing into the reception body and the first valve row, and
wherein a plurality of pressure sensor bores issue into a first surface of the reception body in which the isolating-valve and changeover-valve reception bores are provided, the plurality of pressure sensor bores arranged next to or between the low-pressure accumulator bores, one of the pressure sensor bores connected to a pressure-medium duct that penetrates through one of each of the isolating-valve and changeover-valve reception bores, and which has a connection to one of the pair of brake-pressure transducer connections, the one of the pressure sensor bores being oriented in alignment with the pressure-medium duct penetrating through the one of the isolating-valve and changeover-valve reception bores.

2. The hydraulic system as claimed in claim 1, wherein the isolating-valve reception bores are blind bores which issue into the reception body in each case in a transverse position between two wheel-brake connections of a brake circuit.

3. The hydraulic system as claimed in claim 1, wherein a clearance is provided in each case between two wheel-brake connections for the purpose of leading through a pressure-medium duct which is connected to the isolating-valve reception bores and which connects the brake-pressure transducer connection belonging to a brake circuit, via the associated isolating-valve reception bore, to the two valve reception bores of the first valve row which are associated with the respective brake circuit.

4. The hydraulic system as claimed in claim 1, wherein the isolating-valve reception bores are arranged in alignment with the changeover-valve reception bores in each case between a pair of wheel-brake connections.

5. The hydraulic system as claimed in claim 1, wherein the first valve row is arranged between the isolating-valve reception bores and the changeover-valve reception bores, the valve reception bores of the first valve row and the isolating-valve and changeover-valve reception bores issuing in a parallel arrangement into a first flange surface of the reception body.

6. The hydraulic system as claimed in claim 5, wherein two noise damping chambers issue transversely with respect to the isolating-valve reception bores, in a diametral arrangement, in each case into a lateral surface of the reception body, which lateral surface is delimited by the first and a second flange surface.

7. The hydraulic system as claimed in claim 6, wherein the two noise damping chambers are arranged parallel to the pump bore and are in each case penetrated transversely by a pressure-medium duct which, for connecting the noise damping chambers to the pump bore, extends from a further lateral surface of the reception body into a high-pressure region of the pump bore.

8. The hydraulic system as claimed in claim 7, wherein between the two pressure-medium ducts required for the two noise damping chambers, all wheel-brake connections necessary for a dual-circuit brake installation issue into the further lateral surface, wherein points of issue of the two pressure-medium ducts in the further lateral surface being closed, tight to pressure medium, by press-in bodies.

9. The hydraulic system as claimed in claim 6, wherein the two brake-pressure transducer connections issue directly into the second flange surface, the brake-pressure transducer connections being spaced apart, by the noise damping chambers issuing into the lateral surface, from the wheel-brake connections arranged in the plane of the brake-pressure transducer connections.

10. The hydraulic system as claimed in claim 6, wherein to fasten a control apparatus to the first flange surface and an electric motor to the second flange surface, the reception body is provided with a plurality of through bores which are penetrated by a plurality of screws in the manner of a tie rod, in order to fasten the control apparatus and electric motor to the reception body.

11. The hydraulic system as claimed in claim 1, wherein the reception body is block-shaped.

12. A hydraulic system for a slip-controlled brake installation comprising:
a reception body which receives inlet valves in a plurality of valve reception bores of a first valve row and outlet valves in a second valve row,
a pump bore arranged in the reception body and which is oriented transversely with respect to a direction of issue of the valve reception bores between the two valve rows,
changeover-valve reception bores arranged between the first valve row and the second valve row and which are connected to a suction side of the pump bore and to a pair of brake-pressure transducer connections,
isolating-valve reception bores arranged in the reception body outside the two valve rows, and
a pair of low-pressure accumulator bores in a parallel arrangement, which issue into the reception body remotely from the first valve row and next to the second valve row,
wherein the isolating-valve reception bores are arranged between a plurality of wheel-brake connections issuing into the reception body and the first valve row,
wherein pressure sensor bores issue into a first flange surface and are arranged next to or between the low-pressure accumulator bores, and
wherein at least one of the pressure sensor bores is connected to a valve reception bore of the second valve row, for which purpose the reception body is penetrated, on a lateral surface opposite to another lateral surface, by at least one pressure-medium duct which traverses the pressure sensor bore in the direction of the associated valve reception bore in the second valve row.

13. A hydraulic system for a slip-controlled brake installation comprising:
a reception body which receives inlet valves in a plurality of valve reception bores of a first valve row and outlet valves in a second valve row,
a pump bore arranged in the reception body and which is oriented transversely with respect to a direction of issue of the valve reception bores between the two valve rows,
changeover-valve reception bores arranged between the first valve row and the second valve row and which are connected to a suction side of the pump bore and to a pair of brake-pressure transducer connections,
isolating-valve reception bores arranged in the reception body outside the two valve rows, and
a pair of low-pressure accumulator bores in a parallel arrangement, which issue into the reception body remotely from the first valve row and next to the second valve row,
wherein the isolating-valve reception bores are arranged between a plurality of wheel-brake connections issuing into the reception body and the first valve row, and
wherein two pulsation damper bores issue into the reception body from the direction of a flange surface between the pump bore and two low-pressure accumulator bores, each pulsation damper bore being connected to a pressure-medium duct which, in each case, connects one of the two low-pressure accumulator bores to a suction region of the pump bore.

14. A hydraulic system for a slip-controlled brake installation comprising:
a reception body which receives inlet valves in a plurality of valve reception bores of a first valve row and outlet valves in a second valve row,
a pump bore arranged in the reception body and which is oriented transversely with respect to a direction of issue of the valve reception bores between the two valve rows,
changeover-valve reception bores arranged between the first valve row and the second valve row and which are connected to a suction side of the pump bore and to a pair of brake-pressure transducer connections,
isolating-valve reception bores arranged in the reception body outside the two valve rows, and
a pair of low-pressure accumulator bores in a parallel arrangement, which issue into the reception body remotely from the first valve row and next to the second valve row,
wherein the isolating-valve reception bores are arranged between a plurality of wheel-brake connections issuing into the reception body and the first valve row, and
wherein a sensor bore is provided for receiving a rotary-signal and/or position transducer between the two valve rows, in order to detect the position of pumping pistons in the pump bore, for which purpose the sensor bore issues into a motor reception bore which issues transversely with respect to the pump bore and in which a pump drive is inserted.

15. A hydraulic system for a slip-controlled brake installation comprising:
a reception body which receives inlet valves in a plurality of valve reception bores of a first valve row and outlet valves in a second valve row,
a pump bore arranged in the reception body and which is oriented transversely with respect to a direction of issue of the valve reception bores between the two valve rows,
changeover-valve reception bores arranged between the first valve row and the second valve row and which are connected to a suction side of the pump bore and to a pair of brake-pressure transducer connections,
isolating-valve reception bores arranged in the reception body outside the two valve rows, and
a pair of low-pressure accumulator bores in a parallel arrangement, which issue into the reception body remotely from the first valve row and next to the second valve row,
wherein the isolating-valve reception bores are arranged between a plurality of wheel-brake connections issuing into the reception body and the first valve row, and
wherein a leakage bore issues into the reception body from the direction of a second flange surface between the low-pressure accumulator bores, the leakage bore being connected to the pump bore via a pressure duct arranged between the low-pressure accumulator bores.

* * * * *